United States Patent [19]

Mehdipour et al.

[11] Patent Number: 4,774,571

[45] Date of Patent: Sep. 27, 1988

[54] COMPUTERIZED TICKET DISPENSER SYSTEM

[76] Inventors: Fariborz Mehdipour, 209 Montana Ave., Apt. 201, Santa Monica, Calif. 90403; Faramarz Mehdipour, 10558 Eastborne, Apt. 2, Los Angeles, Calif. 90024; Ebrahim Mehdipour; Farzad Mehdipour, both of 723 San Vicente Blvd., Santa Monica, Calif. 90402

[21] Appl. No.: 51,708

[22] Filed: May 20, 1987

[51] Int. Cl.⁴ ............................................. H04N 7/18
[52] U.S. Cl. ...................................... 358/108; 358/93; 340/51; 364/467
[58] Field of Search ..................... 358/108, 93, 305; 340/51; 364/467; 235/384

[56] References Cited

U.S. PATENT DOCUMENTS

| | | | |
|---|---|---|---|
| 3,919,466 | 11/1975 | Huwyler et al. | 358/93 |
| 4,491,923 | 1/1985 | Look | 358/93 X |
| 4,603,390 | 7/1986 | Mehdipour et al. | 340/51 X |
| 4,703,347 | 10/1987 | Yasuda et al. | 358/108 X |

Primary Examiner—Howard W. Britton
Assistant Examiner—Victor R. Kostak
Attorney, Agent, or Firm—Keith D. Beecher

[57] ABSTRACT

A computerized ticket dispensing system which includes a first camera for reading the license plate of a vehicle entering a parking area, and a second camera for reading the license plate of the vehicle as it leaves the parking area. In each instance, the letters and numbers on the license plate of each vehicle are converted into digital signals. The system responds to the digital signals from the cameras to determine the time of entry and time of exit of the vehicle. A first ticket is dispensed at the entrance showing the license plate and the time of entrance. The system also produces a ticket at a cashier's station at the exit showing the license plate and the time of exit. Both tickets are given to the cashier who determines the amount due, and when the amount is paid the cashier opens the gate. The system may also be automatic with a currency machine being provided which opens the exit gate when the proper parking fee has been inserted into the currency machine.

8 Claims, 2 Drawing Sheets

4,774,571

COMPUTERIZED TICKET DISPENSER SYSTEM

BACKGROUND OF THE INVENTION

Parking lots today, for the most part, are manually operated. The person parking his car receives a ticket from the parking attendant on which his time of entry is stamped. When the person leaves the parking area, his ticket is again time-stamped by the attendant, and the attendant calculates the amount of money to be paid by the customer. However, this practice is relatively costly and inefficient, cash security is at a minimum, and it also makes it easy for a dishonest attendant to misappropriate funds.

A computerized parking system is described and claimed in U.S. Pat. No. 4,603,390 which is rapid and efficient, and which provides for a positive record to be maintained as to the time each vehicle was actually in the parking area, and the total amount of parking fees which should have been paid for each vehicle.

The system described in the patent provides for an effective management of a parking system, and provides the proprietor with improved control of the overall operation of the system, and specifically to provide optimum control of the cash register and to prevent any mishandling of funds. In addition, the system described in the patent increases security since it can provide for all cash to be retained in the theft-proof register. The system further provides optimum traffic control regardless of the number of entrance and exit gates, including information as to the exact number of cars within the parking area at any time, and the license number of each car.

The system of the patent serves particularly to keep costs down and revenues up in the operation of a parking system. It provides constant monitoring of daily income, and can issue daily receipts for daily customers, as well as periodic billing, for monthly customers.

The system of the present invention is generally similar to the system described in the patent and it has the same features and advantages which are inherent in the former system. However, the system of the present invention operates in a different manner, and is somewhat simpler than the system of the patent.

It will become evident as the description proceeds that although the system of the invention has particular utility with respect to parking lots, and it will be described in that environment in the subsequent specification, the system has other applications, such as in conjunction with toll roads, and the like, for monitoring motor vehicles by reading and storing the license plate numbers of the vehicles, and for example, an image of the driver's face.

The system of the invention can also be used for security purposes in the parking facilities of office and apartment buildings; as speed controls on highways and freeways; and to prevent theft of motor vehicles. The system also can be hooked into the police computer system and used to detect stolen cars with outstanding citations, as they enter the facility.

DETAILED DESCRIPTION OF THE ILLUSTRATED EMBODIMENT

Figure 2:
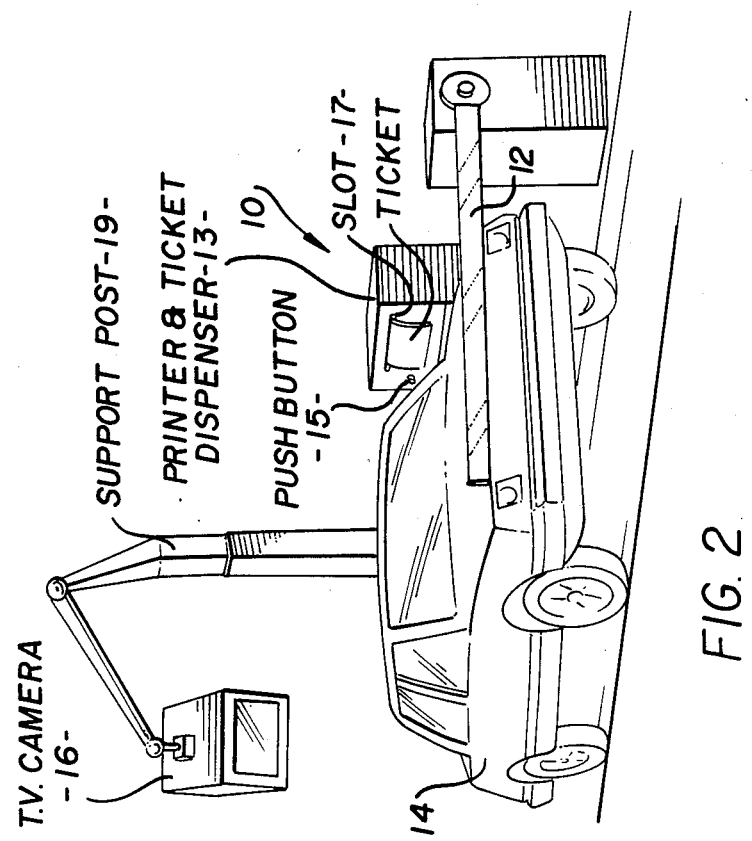
FIG. 2 is a schematic representation of a car at the entrance gate of a parking lot in which the system has been installed.

The representation of FIG. 2 shows schematically the entrance 10 to a parking facility equipped with an entrance gate 12. As a motor vehicle 14 arrives at the entrance 10, its license plate is read by a television camera 16. A ticket dispenser 13 (FIG. 1) is located at the entrance 10, and the gate 12 is opened when the entering motorist punches button 15 and withdraws a ticket through the slot 17. Actuation of button 15 not only operates electric circuitry to cause gate 12 to open, but also operates control circuitry within unit 13 to operate a cutting mechanism to separate the dispensed ticket from a roll in the unit. The ticket dispenser issues a ticket on which is printed the license number of the vehicle, the time of entry, and an identifying number. The ticket dispenser may be a video copy processor, using thermal copy paper, of the type presently manufactured by Mitsubishi (P7OU).

The parking area also has an exit 18 which includes an exit gate 20. As the vehicle 14 leaves the parking area or facility, it is driven to the exit 18, and is stopped adjacent to a cashier's station 22. A second camera 24 reads the license plate of the vehicle 14 when it is stopped at the exit gate. Cameras 16 and 24 may be of the type presently manufactured by General Electric.

If so desired, additional cameras may be mounted at the entrance and exit directed at the face of the driver, so that an image of the face may appear on the ticket.

The cameras 16 and 24 are connected to a video processor and random access memory 22 which, in turn, is connected to a microprocessor 25. Microprocessor 25 is provided with a usual programmable read-only memory 26, a random access memory 28, and a battery-powered back-up random access memory 30. A video monitor 50 is provided at the cashier's station 22. This monitor, for example, may be a Panasonic ST-1000M. A second monitor 70 may also be provided.

The units described above constitute an image processing center 32 which serves to convert the information sensed by cameras 16 and 24 into corresponding digital signals, and to store the digital signals for processing by microprocessor 25. These signals, in each instance, correspond to the numbers and letters on the license plate of the vehicle 14, and even a representation of the driver's face, as the vehicle enters and leaves the parking facility. When the vehicle 14 arrives at the entrance 10, and as its license plate numbers and letters are read by camera 16, the video signals from the camera are processed in unit 22 which converts them to digital signals, and the resulting digital signals are fed to a microprocessor 25 which causes the digital signals which correspond to the license plate numbers, and the representation of the driver's face, to be stored in the memory of a computer 34.

The computer then causes ticket dispenser 13 to print the license number, an image of the driver's face, the time of entry of the vehicle, and a ticket number, on a ticket in the dispenser. When the ticket is withdrawn by the driver of the vehicle, a signal is applied to entrance gate 12 causing the entrance gate to open, and permitting the vehicle to enter the parking area. At the same time, the number identifying the ticket is stored in the computer memory, together with the license information and time of entrance of the vehicle.

When the vehicle is driven to the exit 18, camera 24 reads the letters and numbers on its license and the corresponding video signals are processed in unit 22, and the resulting digital signals are processed by microprocessor 25. The license number, time of exit, and ticket number are displayed on display 38. The cashier is handed the ticket by the driver, and uses the information on the ticket and on the display to compute the charges. Alternately, the exit information is printed on a second ticket by printer 36, and the cashier refers to both tickets to compute charges. When the parking fees have been paid to the cashier, the cashier by an appropriate manual control, opens the exit gate 20. In both instances, the driver's face also may appear on the ticket.

If desired, an automatic currency receiving machine may be located at the cashier's station 22, which receives the appropriate parking fees, and provides change, if necessary. After the proper fees have been received by the machine, the exit gate 20 is automatically opened. The machine 52 may, for example, be of the type described in U.S. Pat. Nos. 4,321,671 and 4,310,885.

Figure 1:
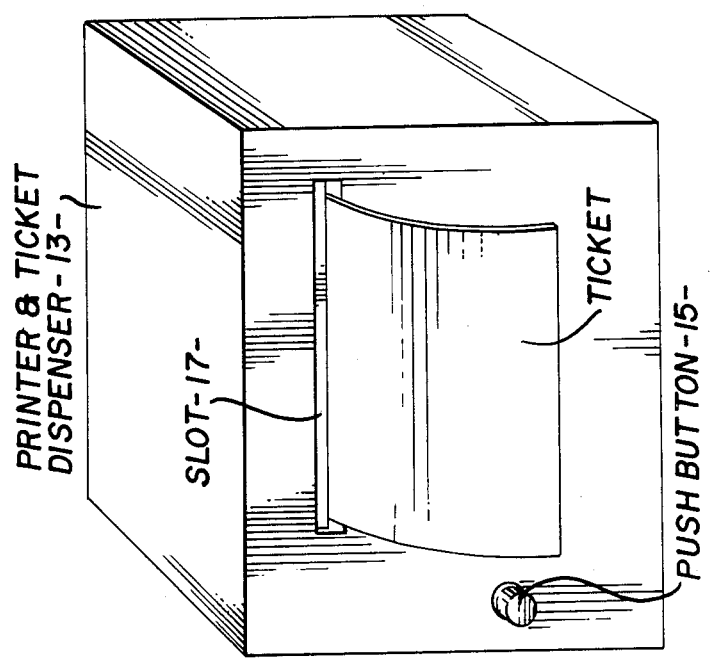
FIG. 1 is a perspective view of a printer and ticket dispenser used in the system of the invention.

It will be evident that a complete control over each vehicle within the parking area can be achieved by the system of FIG. 1, with the system being capable of providing information at any time as to all of the vehicles then parked with the facility, the time and date each vehicle entered the facility, and the time and date each vehicle left the facility.

The computer 34 also has the ability of printing on the ticket issued by printer 36 the name of the cashier then on duty at cashier's station 22. A video monitor 70 may be provided which may also be located at the cashier's station, and which may display the license number of each vehicle as it enters the facility. This permits the cashier to enter license numbers manually into the computer in the event camera 16 does not sense the license information.

The components of the image processing unit 32, and cameras 16 and 24, may form part of a system presently marketed by the Perceptics Corporation of Knowville Tenn. Alternately, the cameras may be of the type marketed by Panasonic as Model CCD, which feature a built-in clock and a built-in counter, for providing time information and identifying numbers for the tickets. The computer 34 may also be any appropriate computer. For example, a computer arketed by the Digital Equipment Corporation and designated as the Microvax 2000 is appropriate for use as computer 34.

The computer 34 may also control a cash register at the cashier station to cause the cash register to record the amount of cash which should have been received for each transaction. The cash register may control the exit gate so that the exit gate will open only after the proper cash payment has been entered in the cash register.

There are two options to the system of the invention:

In the first option, the camera is directly coupled to the ticket dispenser, and the ticket dispenser digitizes the video information from the camera, and subsequently prints the ticket. Such printers are readily available on the market.

Figure 3:
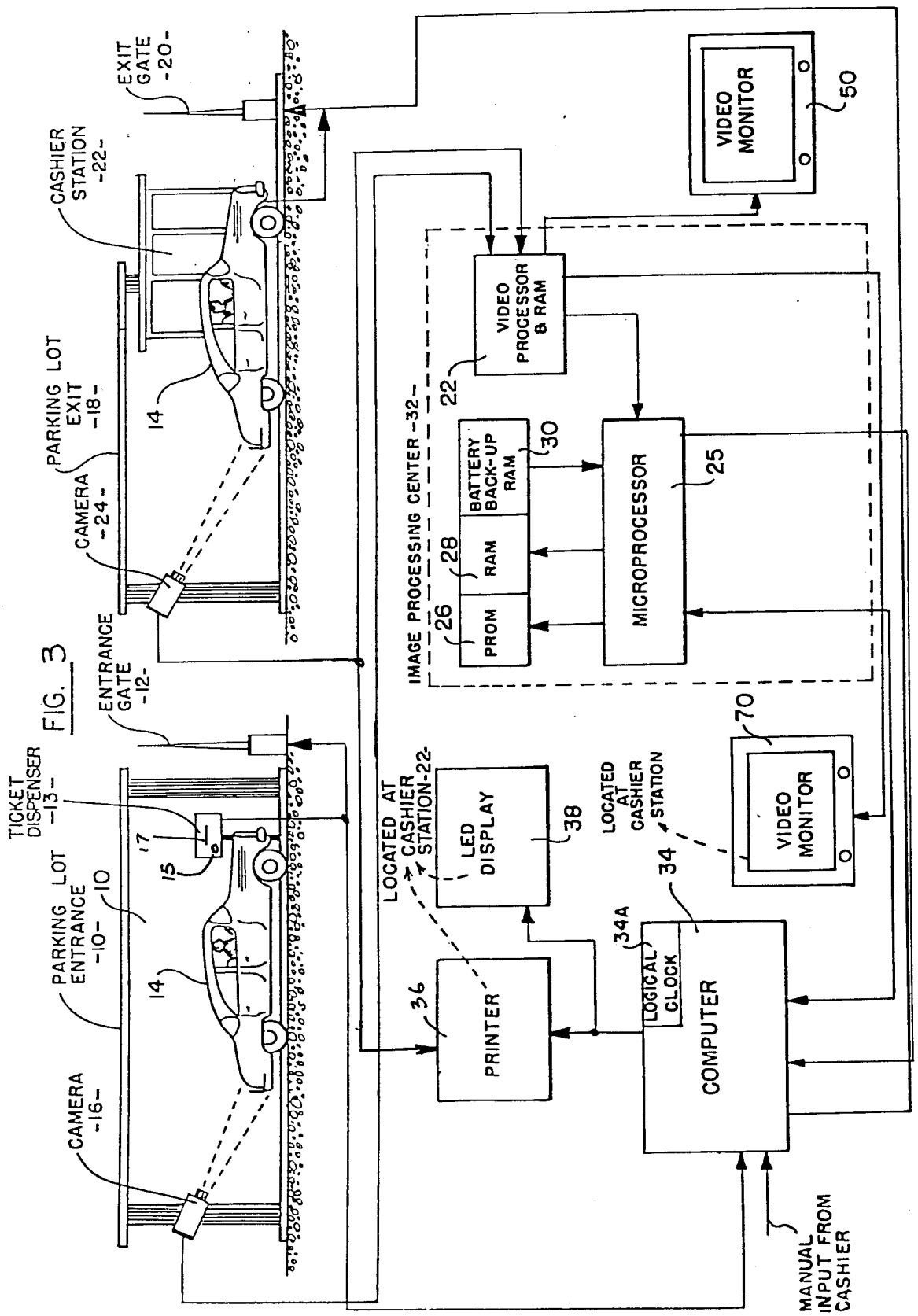
FIG. 3 is a schematic diagram, partly in block form, of a system constituting one embodiment of the invention.

In the second option, additional equipment is provided, such as shown in FIG. 3, in which the video information from the camera is processed prior to its application to the printer.

In addition, the system of FIG. 3 may process digital signals representing the drivers' faces, and compare the signals with other signals stored in memory to assure that authorized persons only are entering the parking facility. Such a system is described, for example, in an article in *Scientific American,* March, 1987, at page 88, entitled "Optical Neural Computers".

It will be appreciated that while a particular embodiment of the invention has been shown and described, modifications may be made. It is intended in the claims to cover all modifications which come within the true spirit and scope of the invention.

We claim:

1. A system for detecting the entrance of vehicles into a particular area, said area having an entrance and an exit, each of the vehicles being equipped with a license plate, said system including: a first camera mounted at the entrance of the area in a position to be directed at the license plate of each vehicle entering the area; data processing system connected to the camera for converting the indicia on the license plate as sensed by the camera into corresponding digital signals, said data processing system including a logical clock for generating signals representative of the entrance time of the vehicle into the area; and a ticket dispenser coupled to said data processing system and responsive to digital signals from said data processing system for printing indicia on a ticket representative of the license number of the vehicle and the time of entrance thereof and from which the ticket is withdrawn by the driver of the vehicle.

2. The system defined in claim 1, in which said ticket dispenser is located at the entrance of said area.

3. The system defined in claim 2, and which includes a second camera mounted at said exit in position to be directed at the license plate of each vehicle leaving the area and connected to said processing system to enable said processing system to convert the indicia on the license plate into digital signals.

4. The system defined in claim 3, and which includes output means connected to the processing system including display means located at the exit for displaying the license number and the time at which the vehicle leaves the area.

5. The system defined in claim 4, in which said output means includes a printer located at the exit for providing a ticket bearing the license number and the time at which the vehicle leaves the area.

6. The system defined in claim 2, and which includes a gate positioned at said entrance, and means connecting said dispenser to said gate to cause said gate to open when the ticket is withdrawn from said dispenser.

7. The system defined in claim 3, and which includes a video monitor means connected to said processing system for displaying the indicia of the license plate sensed thereby.

8. The system defined in claim 1, in which said processing system responds to video signals from said camera to digitize and store image signals representative of the faces of the drivers of the vehicles, and compares said image signals with image signals stored in said processing system.

* * * * *